United States Patent [19]
Oliver et al.

[11] 3,961,550
[45] June 8, 1976

[54] BAND SAW

[76] Inventors: Everett O. Oliver, 15504 E. Hornell, Whittier, Calif. 90604; John T. Millwee, 18231 Sharon Lane, Villa Park, Calif. 92667

[22] Filed: Feb. 24, 1975

[21] Appl. No.: 552,300

[52] U.S. Cl. .................................. 83/574; 83/817; 30/380
[51] Int. Cl.² ..................... B26D 5/08; B27B 13/00
[58] Field of Search ............ 83/574, 816, 817, 818; 30/380, 385, 386

[56] References Cited
UNITED STATES PATENTS

| | | | |
|---|---|---|---|
| 3,117,600 | 1/1964 | Davis | 83/574 X |
| 3,521,682 | 7/1970 | Schnizler, Jr. | 83/816 |

*Primary Examiner*—Willie G. Abercrombie
*Attorney, Agent, or Firm*—Fulwider, Patton, Rieber, Lee & Utecht

[57] ABSTRACT

There is disclosed a band saw which can be utilized as a stationary or as a portable tool. The saw is principally designed for portable use with its table in a saw-supporting position, resting on the work, although it can also be utilized in combination with a bench support as a stationary band saw with its table in a work-supporting position. The weight and bulk of the saw are minimal, as necessary for its portable uses, by utilization of a universal adjustment mechanism providing fixed adjustability of the tension and tracking of the saw blade. The saw frame and table are preferably of cast metal to permit simple assembly into a rigid, lightweight tool that is free of frequent maintenance and adjustment. The saw is preferably provided in combination with a bench support for mounting the saw on a work table to provide a stationary band saw.

14 Claims, 15 Drawing Figures

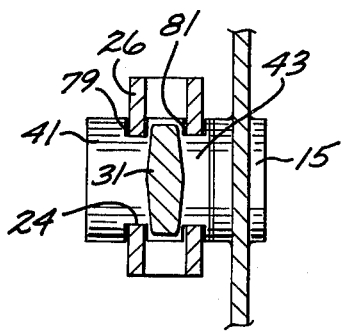
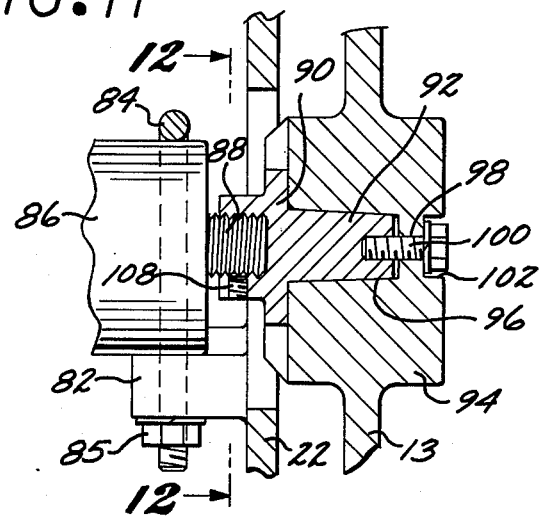
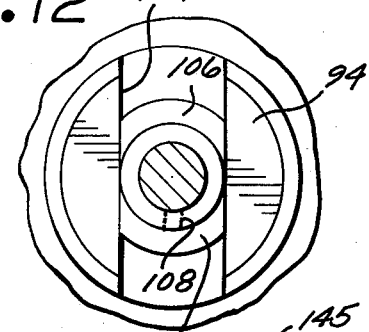
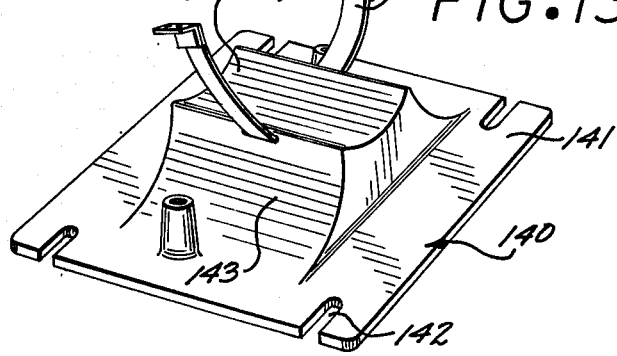
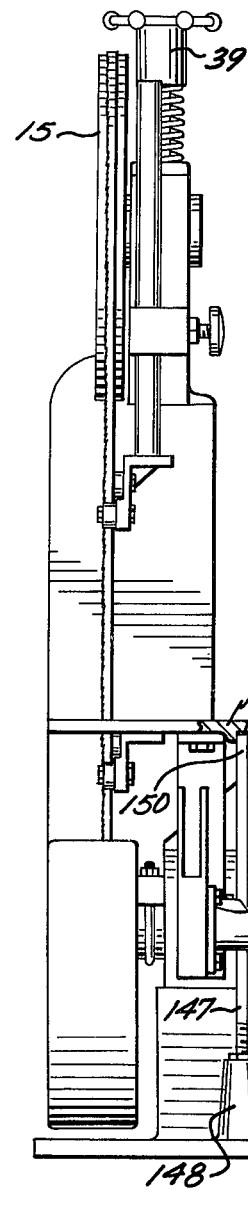
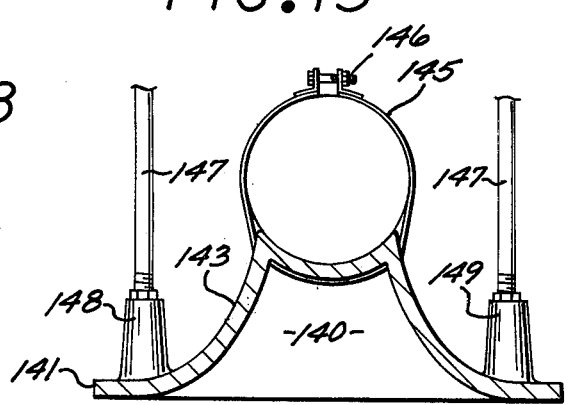

BAND SAW

BACKGROUND OF THE INVENTION

There exists a need for a portable saw capable of performing intricate, curved cutoffs of thick work pieces or bundles of work pieces such as, rafters, beams, etc. This need is particularly acute in the home construction field for the field frabrication of corbels or curved or scalloped rafter tails and the like. Traditionally, these members have been fabricated in shops using stationary band saws with several operators to support and move the bulky rafters and beams.

A recent attempt has been made to provide a portable band saw for field use in the construction industry; see U.S. Pat. No. 3,658,102. The construction of this saw utilizes a tubular metal frame to support distal saw wheels which carry the continuous band saw blade. The manufacture and use of similar band saws has indicated that the prior construction is not ideally suited. The tubular metal frame cannot be readily produced in mass quantities because it requires tedious custom alignment of the tubular frame and band saw wheels. The tubular frame can also be readily bent out of alignment by mishandling and, therefore, requires frequent adjustment and maintenance.

Band saws typically require a number of adjustment means for fixed adjustment of the tension and tracking of the saw blade. These adjustments are commonly performed by fixed adjustment of the tilt and the distal position of the idler wheel on the saw frame with adjustments such as those described in U.S. PAT. Nos. 120,949 and 3,362,445. The adjustment means conventionally employed in stationary band saws are not ideally suited for use in portable saws because of their bulk and weight. Accordingly, it is desirable to provide a simple, universal means for effecting fixed adjustment of tension and tracking of a band saw blade for portable use.

The usefulness of a portable band saw can be vastly increased by providing a work table support whereby the portable saw can be supported as a stationary band saw and can be readily detached therefrom for its use as a portable band saw.

BRIEF DESCRIPTION OF THE INVENTION

This invention comprises a portable band saw, preferably in combination with a bench support therefor for converting the portable band saw to a stationary band saw. The saw is constructed with a rigid and lightweight frame supporting distal blade wheels including driven and idler blade wheels and with universal adjustment means in combination with the idler blade wheel to provide for fixed adjustability of the band saw blade tension and tracking. The adjustment means include means for the fixed adjustability of the lateral and longitudinal positions and the tilt of the idler blade wheel whereby the tension and tracking on the band saw blade can be fixedly adjusted.

The saw includes a prime mover carried by the saw frame and connected in driving relationship to the driven blade wheel and, on its opposite end, the aforementioned universal adjustment means. The frame, at the end opposite the driven blade wheel, is formed with an open-ended channel which bears an elongated, transverse slot. Slide plate means in the form of an elongated plate having a tapered inner end and bearing, at its opposite end, threaded shaft means, is mounted in the channel. The slide plate bears, on its opposite sides, bosses which track in the elongated slot. The bosses are bored with a central bore to receive an idler blade wheel support shaft which projects therefrom for journalled support of the idler blade wheel. The threaded shaft, carried at the end of the slide plate means, coaxially carries a coil spring which is biased between the end of the frame and hand wheel means on the threaded shaft whereby the tension on the saw blade can be fixedly adjusted. The tracking of the saw blade, which is controlled by the tilt of the idler blade wheel, is fixedly adjusted by screw means that are threadedly engaged on the frame to project into the open channel of the frame and bear against the tapered end of the slide plate means whereby the slide plate means can be tilted in the channel.

The adjustment means also include provision for the adjustment of the axial position of the idler blade wheel support shaft in the receiving bore carried by the elongated slide plate means. The threaded shaft bears a flat along a portion thereof that projects into the shaft receiving bore of the slide plate means. The flat is placed opposite the received end of the threaded shaft so that the end of the threaded shaft can be turned into binding engagement with the flat on the idler blade wheel support shaft to provide a fixed adjustability in the axial position of this shaft.

The band saw is preferably provided with bench support means whereby the saw can be supported with its table in a work-supporting position on a stationary work bench. The bench support preferably comprises a cradle for receiving a portion of the band saw, such as a lower portion of the band saw frame or the housing of the prime mover with latching means to secure the received portion of the band in the cradle and with one or more jack screws to bear against the undersurface of the work table to stabilize the assembly of saw and bench support.

The saw is preferably formed of cast construction with a cast frame and saw blade guard assembled to a cast table and prime mover support bracket. The assembly is fitted with blade guide means, one carried on the table and the other carried by a support rod that is slidable received on the frame whereby the spacing between the blade guides can be adjusted for work thicknesses in a conventional manner.

BRIEF DESCRIPTION OF THE DRAWINGS

FIG. 10 is a view along lines 10 — 10 of FIG. 8;
FIG. 11 is a view along lines 11 — 11 of FIG. 3;
FIG. 12 is a view along lines 12 — 12 of FIG. 11;
FIG. 13 is a perspective view of bench support for use in the invention;
FIG. 14 is an elevation view of the saw on its stationary position in combination with the bench support;
and
FIG. 15 is a view along lines 15 — 15 of FIG. 14.

DESCRIPTION OF PREFERRED EMBODIMENTS

Figure 1:
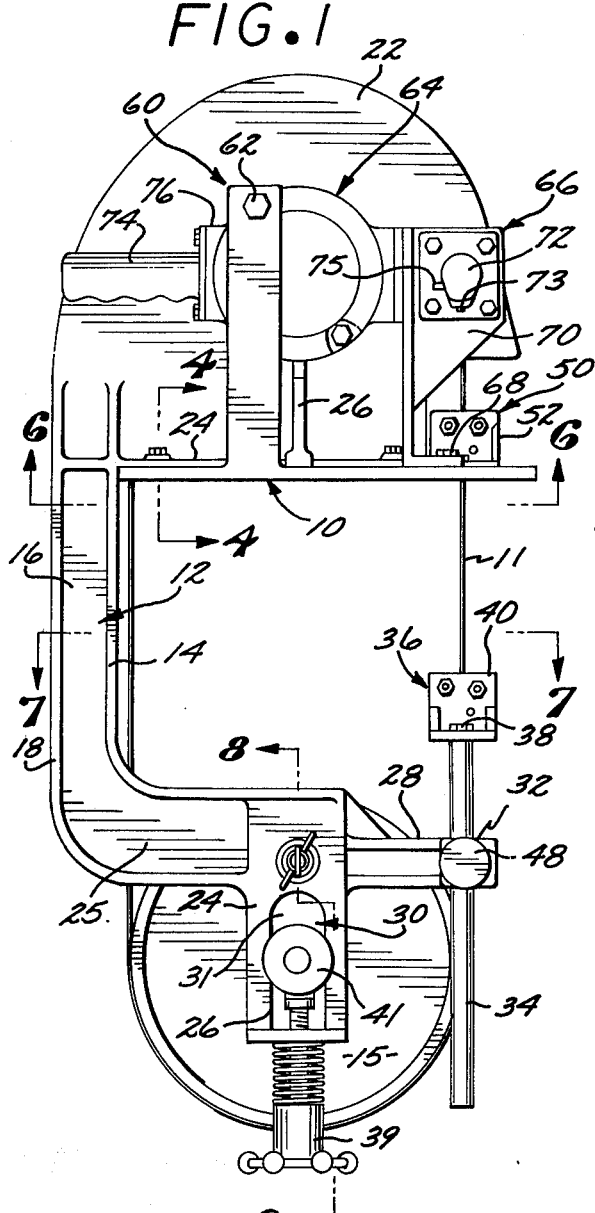
FIGS. 1 and 2 are elevation views of opposite sides of the saw of the invention.
Figure 2:
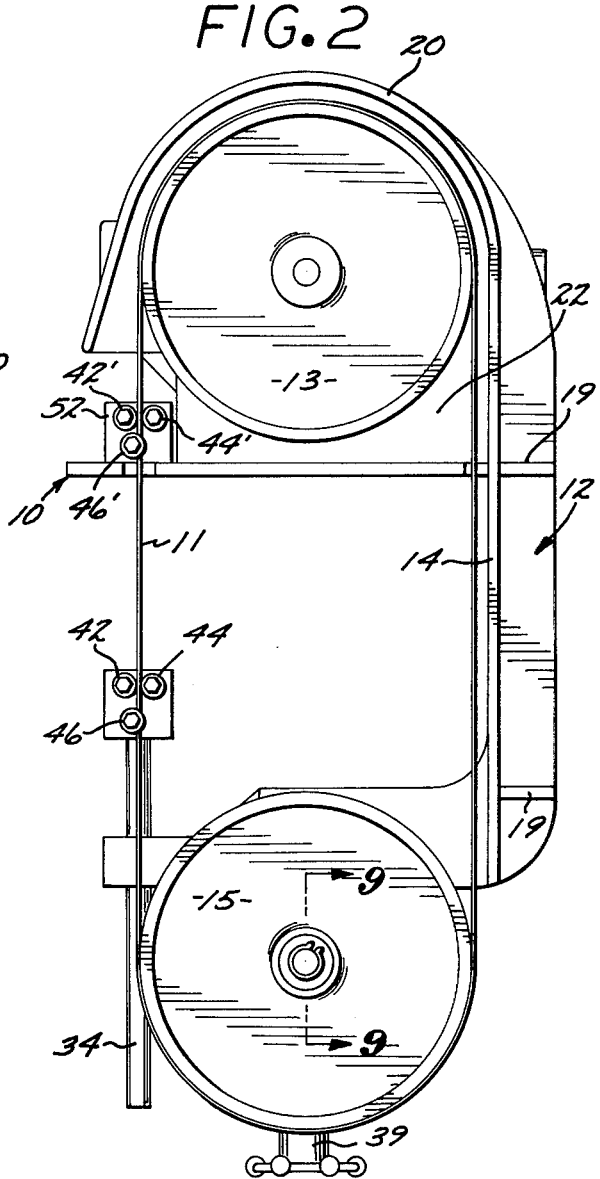

Referring now to FIGS. 1 and 2, the portable band saw is an assembly of a table 10, frame and blade guard member 12, which supports distal blade wheels 13 and 15 that carry the continuous saw blade 11. The table and frame components are formed of cast metal which is preferred for rigidity and lightness while, nevertheless, insuring simplicity of assembly and precision of mating parts. The frame comprises a generally elongated column which is formed with a flat rib 14 of generally major width, an outer rib 18 of lesser width and an intermediate rib 16. As shown in FIG. 2, the wide rib 14 on the blade side of the frame has a curved portion 20 which extends about the blade and the blade wheel to provide a protective guard. The frame casting includes a plate 22, integral therewith, which carries mounting blocks, hereinafter described, to support the subassembly of the prime mover and driven blade wheel. Plate 22 also bears, along its lower edge, flange 24 and brace 26 which provide support for the attachment of the table 10.

The opposite end of frame 12 has a 90 degree bend, section 25, and terminates with channel 24. The channel is open-ended at the outboard end of the frame and has a transverse open-ended slot 26 to receive the saw blade tension and tracking adjustment means 30 described in greater detail hereinafter. The lower end of the frame bears arm 28 which is bored at 32 to receive rod 34 which carries, on its inboard end, blade guide assembly 36 which is secured thereto by machine screw 38 that extends into a bore in the lower leg of a generally L-shaped guide bracket 40. The guide bracket is bored and tapped to provide mounting for a plurality of blade rollers 42 and 44 which are mounted to engage opposite faces of the blade 11 and provide guides for lateral stability of the blade 11. The bracket 40 also supports blade roller 46 which is mounted behind the blade and furnishes support for the rear edge of the blade.

Rod 34 is slidably received in bore 32 of arm 28 and can be fixedly secured to the arm by means such as the threaded end of hand wheel 48 which projects into bore 32 into binding engagement with rod 34. The saw is also provided with a stationary blade guide 50 which is similar in construction to guide 36, including a bracket 52 that is secured to the table 12 and that provides support for rollers 42', 44', and 46' which are similar to the rollers previously described.

The table 10 bears an integral, upright support arm 60 which is bored to receive screw fastener 62 that projects into the housing of the prime mover, e.g., housing 78 of electrical motor 64 to provide mounting of the motor 64 in the assembly. The table also carries an upstanding bracket 66 which is attached to the underside of the work table by screw fasteners 68 and which has a flange 70 to provide support for the attachment of handle 72. The other handle 74 of the saw is carried on mounting bracket 76 which is integral with the casing of motor 64.

Figure 3:
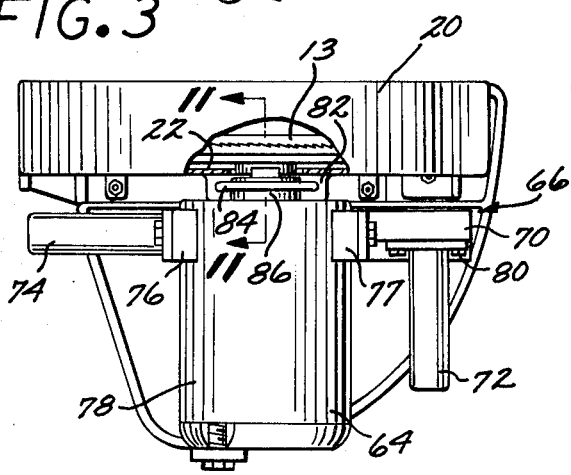
FIG. 3 is a top plan view of the saw.

Referring now to FIGS. 3 and 11, the subassembly of motor 64 and driven blade wheel 13 will be described in greater detail. The motor 64 is contained within motor housing 78 which also houses appropriate gear reduction means for obtaining the proper rotational speed of the blade wheel 13. Typically, electrical motors having rotational speeds of 1700 or 3400 revolutions per minute are employed and these are used with gear reduction units to obtain a rotational speed of blade wheel 13 between about 300 and about 700 revolutions per minute. The housing 78 has mounting brackets 76 and 77 at opposite sides at its output shaft end and these brackets are used for attachment of handle 74, previously described, and for attachment of the motor to bracket 66 carried on the undersurface of table 12. Handle 72 is illustrated in FIG. 3 as attached to flange 70 of bracket 66 by conventional screw fasteners 80.

The flat semi-circular plate 22 of the frame casting 12 bears mounting block 82 which is bored to receive the opposite ends of U-bolt 84 that clamps about the output shaft bearing block 86 of the motor housing 78, thereby securing the subassembly of the prime mover 64 and driven blade 13 in the saw assembly.

Referring to FIG. 11, the mounting of the prime mover subassembly and its constructional details can be seen in greater detail. As there illustrated, the bearing journal block 86 of the prime mover 64 rests upon block 82 which depends from plate 22. The U-bolt 84 encircles the journal block 86 and nuts 85 secure the assembly tightly to block 82. As illustrated, the output shaft 88 of the prime mover is threaded and receives cog 90 which bears on its outboard end, tapered plug 92. The hub 94 of driven wheel 13 has a tapered bore 96 for receiving tapered plug 92. The outboard face of hub 94 is bored at 98 to receive screw fastener 100 and counterbored at 102 to provide a recessed seating of the head of fastener 100. Fastener 100 extends into threaded engagement with a tapped bore in the outboard end of plug 92 to secure driven blade wheel 13 to cog 90. As illustrated in FIG. 12, the inboard face of hub 94 is grooved at 104 to receive cog 90 which bears a chorded flange 106 for mounting in groove 104. The cog 90 is firmly secured to output shaft 88 by a set screw which seats in tapped bore 108 of cog 90. The motor shaft 88 need not be threaded since the set screw mounting of cog 90 can be used equally on an unthreaded shaft.

Figure 4:
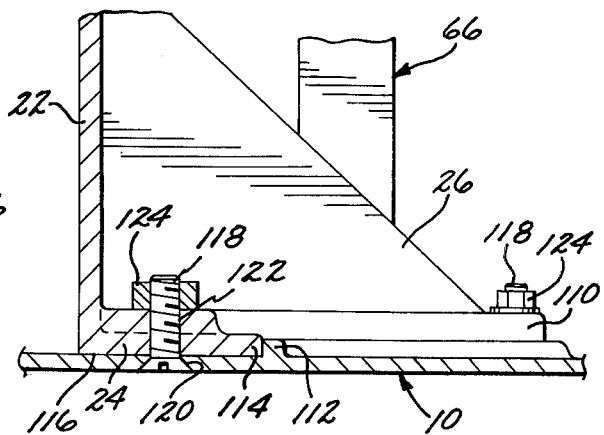
FIG. 4 is a view along lines 4 — 4 of FIG. 1.

Referring now to FIG. 4, the assembly of the frame and table will be described. The frame 12, as previously mentioned, is formed with a flange 24 and bracket 26 which extends from a tang portion 110. The undersurface of the table bears a lip 112 which serves as an abutment for engagement by the edge 114 of flange 24 and a similar edge, not shown, of tang portion 110. The undersurface 116 of flange 114 and tang portion 110 is milled or precisely ground to insure a flat surface which is perpendicular to the plate 22 and the remainder of the frame 12. This milled surface seats against the flat undersurface of the table 10 and is secured thereto by a plurality of screw fasteners 118 which are mounted in counter sunk bores 120 in the table and which extend through aligning bores 122 in flange 24 and tang portion 110. These screw fasteners are secured by conventional nuts 124.

Figure 5:
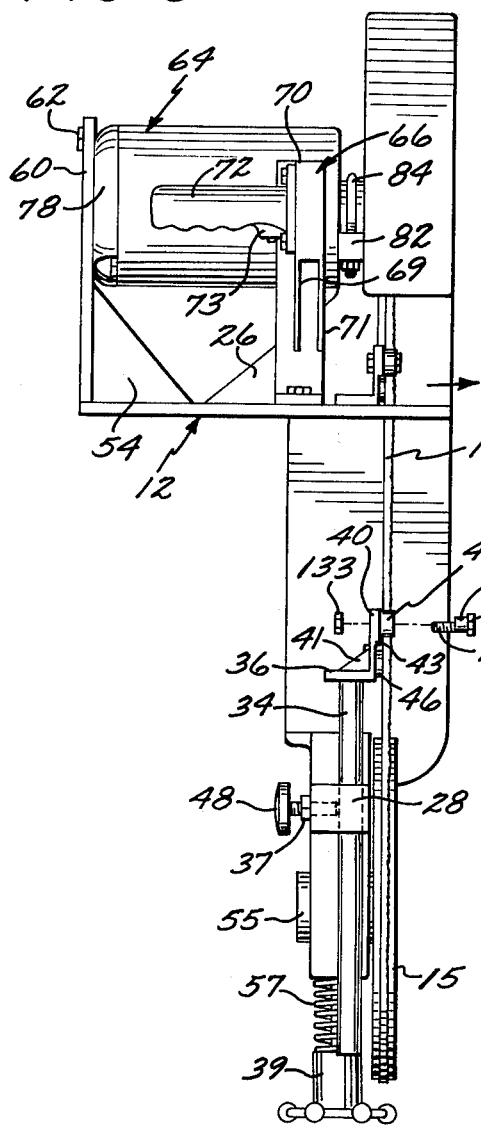
FIG. 5 is an edge elevation view of the saw.

Further details of the construction of the saw can be seen in FIG. 5 which illustrates the prime mover 64 secured with motor and drive casing 78 carried by arm 60 at it outboard end and resting with its inboard end on block 82 and secured thereto by U-bolt 84. Support arm 60 is preferably reinforced by bracket 54 which extends between arm 60 and the undersurface of table 10. Flange 70 of bracket 66 is illustrated as having two webbed portions 69 and 71 to provide strength for the support of handle 72. This handle contains the trigger switch 73 for activation of the prime mover and, as shown in FIG. 1, the handle also includes a conventional detent lock 75 for holding the switch in the on position.

The adjustable blade guide assembly 36 is shown as carried on sliding rod 34 which is secured in position to arm 28 by hand wheel 48 which is provided with a lock nut 37. The generally L-shaped guide bracket 40 is shown with fillet webs 41 and with a stepped surface 43 to permit guide roller 46 to be mounted behind blade 11 and rollers, such as 42, to be mounted to either side of this blade. The rollers 42 and 44 are, preferably, mounted eccentrically to bracket 40 to permit the lateral position of these rollers to be shifted, as necessary. This is accomplished by bolts 130 which have a bushing shoulder 131 for mounting within the inner race of the bearing rollers 42 and 44 and which have an eccentric threaded shaft 132 which project through mounting bores in bracket 40 and which are secured thereto by conventional nut fasteners 133.

Figure 6:
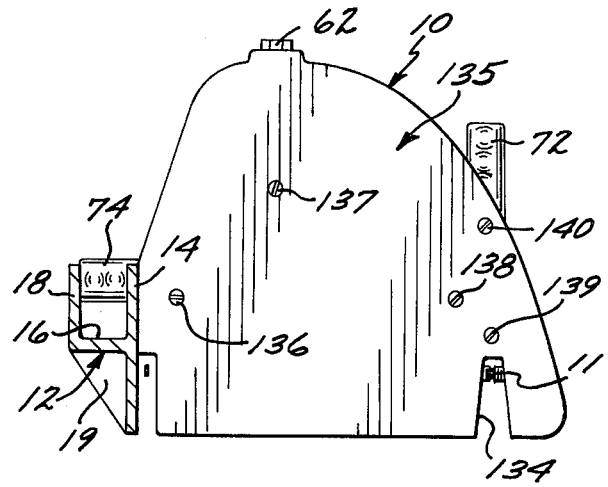
FIG. 6 is a view along lines 6 — 6 of FIG. 1.

Referring now to FIG. 6, the work surface 135 of the work table 10 is illustrated in plane view. This work table has a slot 134 for accommodation of the blade 11 and has a plurality of counter-sunk screw fasteners therein such as fasteners 136–140. Fasteners 136–138 secure the assembly of the frame 12 and the table 10. Screw fastener 139 secures the stationary blade guide assembly 50 while screw 140 secures the handle bracket 66. FIG. 6 also shows the frame column in cross section with web 16, inner, wide rib 14 and the outer half rib 18. A plurality of ribs 19 are also provided at a plurality of spaced vertical locations also indicated on FIG. 2.

Figure 7:
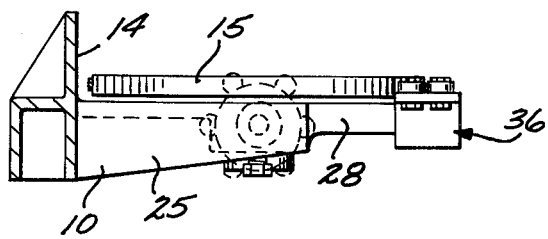
FIG. 7 is a view along lines 7 — 7 of FIG. 1.

The lower portion of frame 12 is illustrated in the view of FIG. 7 which shows idler blade wheel 15, arm 28 and the adjustable blade guide assembly 36. The view also illustrates that web 14 is tapered inwardly slightly in the lower section 25 which supports the idler wheel.

Figure 8:
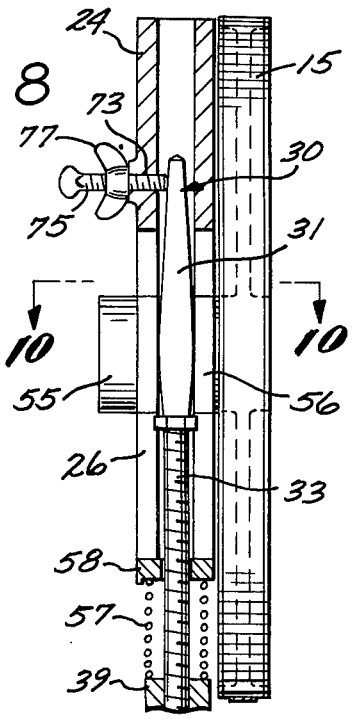
FIG. 8 is a view along lines 8 — 8 of FIG. 1.
Figure 9:
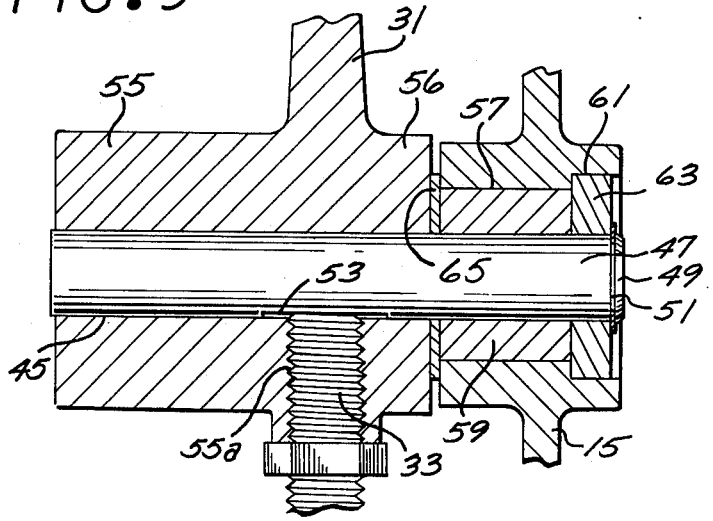
FIG. 9 is a view of the idler wheel and support shaft assembly.

The unitary means for controlling blade tension and tracking is illustrated in detail in FIGS. 8 through 10. As shown in FIG. 8 the lower portion of the frame is formed as an open-ended channel section 24 which has a transverse slot 26, also open at the lower end of the frame. The channel and slot 26 receive slide means 30 which is in the form of a plate 31 having a tapered inner end and bearing, at its outboard end, threaded shaft 33. Shaft 33 projects past the end of the channel section 26 and receives coaxial coil spring 57 that is biased between end plate 58 which bears against the ends of the channel section 26 and the shank of hand wheel 39. The plate 31 bears, on its opposite surfaces, bosses 55 and 56 which are received, in sliding engagement, within slot 26 of the open-ended channel 24.

Referring now to FIG. 9, there is illustrated in greater detail the portion of the plate 31 which includes the bosses 55 and 56. The plate 31 bears a central bore 45 through the bosses 55 and 56 to receive the idler blade wheel support shaft 47. This support shaft is grooved at 49 to receive a spring retainer clamp 51 and bears along its mid-portion a flat 53 which is aligned opposite threaded bore 55 in the outboard end of plate 31. The threaded shaft 33 is turned into threaded bore 55 and projects into bore 45 to engage, in binding relationship, the flat 53 of shaft 47, whereby the axial position of the shaft in bore 45 can be fixedly adjusted. The hub of wheel 15 is bored at 57 to receive a lubricated bushing 59 and is counter-bored at 61 to provide an annular shoulder for engagement by washer 63 that is retained on the shaft by spring clip 51, thereby securing the idler wheel 15 snugly against washer 65.

The tracking of the blade on the blade wheels 13 and 15 is controlled by the fixed adjustability of the tilt of idler blade wheel 15. This is accomplished by the adjustment means illustrated in FIG. 8 which includes the tapered inboard end of plate 31 that projects opposite a threaded bore 73 in one of the webs of channel 24. Seated in the threaded bore 73 is a thumb screw 75 with a locking wing nut 77. Thumb screw 75 projects into the channel into engagement with the tapered end of plate 31 so that advance or retraction of the thumb screw provides a controlled adjustability of the tilting of wheel 15. This tilt can be fixedly secured in the assembly by tightening of wing nut 77 when the desired setting is reached.

FIG. 10 illustrates a cross-sectional view of the channel 26 and groove 24 in which is seated plate 31 and bosses 55 and 56 on opposite surface thereof. As illustrated, bosses 55 and 56 bear transverse grooves 79 and 81 for receiving the webs of channel 26. These grooves are slightly oversized to permit the desired tilting of plate 31 in the manner previously described.

As previously mentioned, the band saw is adaptable for portable or stationary uses. FIGS. 13–15 illustrate the conversion of the portable saw into a stationary band saw. The invention includes in its combination the bench adaptor 140, illustrated in FIG. 13, which has a base plate 141 with apertures or slots 142 for receiving hold down fasteners to secure the bench support to a work bench and the like. The bench support also includes cradle means 143 which has a concave upper surface 144 on which can be rested the housing 78 of the saw motor 64. The bench support also includes attachment means such as band clamps 145 and the like which can be secured about the motor housing 78 to removably attach the motor housing to cradle 143 of the bench support.

FIG. 14 illustrates the band saw in combination with the bench support of FIG. 13. As illustrated, the bench support 140 is shown supporting the tool which rests with motor housing 78 in the cradle 143 and with the band clamp 145 secured about the motor housing by a plurality of screw fasteners 146 and the like. In the stationary working position, the tool is inverted from its normal use during portable operation and the table 10 has its work surface 135 exposed for use as a work support as in the conventional use of band saws. Rigidity is imparted to the combined structure by use of one or more jack screws 147 which are turned into threaded bores in bosses 148 and 149; see FIG. 15. Preferably, the jack screws 147 bear wrench flats 150 and the like to permit their adjustment in the assembly. Also, it is preferred that the under-surface of table 10 bear indented bosses 151 which serve as seats for the end of the jack screws. The jack screws are locked into position in the assembly by lock nut 152 carried on each jack screw. At least one jack screw 147 should be positioned at opposite sides of the assembly to prevent any tilting of the table 10 during use.

The invention has been described with reference to the presently preferred and illustrated embodiments thereof. It is not intended that the invention be unduly limited by this illustration and description of the preferred embodiment. Instead, it is intended that the invention be defined by the means and obvious equivalents thereof set forth in the following claims.

What is claimed:

1. In a band saw having a frame supporting distal blade wheels including driven and idler blade wheels pivotally mounted thereon, a band saw blade extending between and about said blade wheels, prime mover means coupled in driving relationship to said driven blade wheel, the improved mounting means for the idler blade wheel which comprises:
   distal channel means open at one end of said frame;
   elongated slot means transverse to said channel means, also open at said distal end of said frame;
   slide means in the form of an elongated plate having a tapered inner end and bearing, at its opposite end, threaded shaft means;
   boss means on said elongated plate for tracking in said elongated slot and bearing a central bore receiving a blade wheel support shaft projecting therefrom for journalled support of said idler saw wheel;
   tension adjustment means comprising a hand wheel threaded on said threaded shaft means and resilient means biased between said hand wheel and said frame whereby the tension load on said saw blade can be fixedly adjusted; and
   tilt adjustment means comprising screw means threadably carried by said frame and projecting into said channel and bearing the tapered end of said slide means whereby the tilt of said idler blade wheel can be fixedly adjusted.

2. The band saw of claim 1 wherein said threaded shaft is telescopingly received by said elongated plate with its inboard end projecting into said idler blade wheel support shaft receiving bore and wherein said idler blade wheel support shaft bears a flat for engagement by the inboard end of said threaded shaft whereby the axial position of said blade wheel support shaft can be fixedly adjusted.

3. The band saw of claim 2 wherein said elongated plate bears a threaded bore at its outboard end to receive said threaded shaft and said threaded shaft bears locking nut means for fixedly securing the position of said threaded shaft in said threaded bore.

4. The band saw of claim 3 wherein said idler blade wheel bears a hub to receive the outboard end of said blade wheel support shaft and is locked thereto by spring clip means engaged about said shaft.

5. The band saw of claim 1 wherein said frame comprises a column portion defined by a rib and web beam dependant on an integral, semi-circular, wheel guard plate bearing table attachment means for the table of said band saw.

6. The band saw of claim 5 wherein said table attachment means comprises a dependent flange portion on said wheel guard plate.

7. The band saw of claim 5 wherein said wheel guard plate carries mounting block means for the attachment of the subassembly of the prime mover and driven wheel.

8. The band saw of claim 5 wherein said table carries a support arm dependent therefrom for the support of the rear of the prime mover housing.

9. The band saw of claim 1 including handle means dependent from said prime mover and from said table whereby said tool can be grasped and used as a portable tool with the table thereof in a saw-supporting position, resting on work.

10. The band saw of claim 1 in combination with a bench support having a cradle rest for supporting the housing of said prime mover and including attachment means for securing said housing of said prime mover to said cradle rest and further including a plurality of table-stabilizing supports.

11. The band saw combination of claim 10 wherein said table stabilizing supports are a plurality of jack screws supported by threaded bosses on said bench support and extending into contact with the undersurface of said work table.

12. A band saw useful in a first position with its table in a work-supporting position and as a portable saw in an inverted position with its table in a saw-supporting position which comprises:
   a frame;
   a saw table fixedly carried thereon;
   saw blade wheels distally and pivotally mounted on said frame;
   prime mover means carried by said frame and in driving mechanical connection to the driven one of blade wheels;
   adjustment means carried on said frame to vary the distal and tilt positions of the other of said blade wheels whereby the band saw tension and tracking can be fixedly adjusted;
   work table support means including a platform, cradle rest means carried thereon to support said prime mover means and said table with attachment means for the removable attachment of said band saw thereto comprising encircling band means to removably secure about said prime mover means and a plurality of laterally spaced jack screw means extending from threaded engagement to said platform and bearing against the undersurface of said saw table to stabilize said table.

13. The band saw of claim 12 including a saw and wheel guard surmounting said idler wheel including attachment means for the removable attachment of said saw guard means.

14. The band saw of claim 12 including indented bosses on the undersurface of said saw table to receive the upper ends of said jack screws.

* * * * *